United States Patent
Strauss et al.

(10) Patent No.: US 11,206,274 B2
(45) Date of Patent: Dec. 21, 2021

(54) METHOD AND APPARATUS FOR CALIBRATING A SYSTEM FOR RECOGNIZING ATTEMPTS TO PENETRATE A COMPUTER NETWORK

(71) Applicant: Robert Bosch GmbH, Stuttgart (DE)

(72) Inventors: Thilo Strauss, Ludwigsburg (DE); Katharina Dormann, Heidelberg (DE); Markus Hanselmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 317 days.

(21) Appl. No.: 16/384,260

(22) Filed: Apr. 15, 2019

(65) Prior Publication Data
US 2019/0342306 A1     Nov. 7, 2019

(30) Foreign Application Priority Data
May 2, 2018  (DE) .......................... 102018206737.6

(51) Int. Cl.
| | |
|---|---|
| *G06F 21/56* | (2013.01) |
| *G06F 21/62* | (2013.01) |
| *H04L 29/06* | (2006.01) |
| *H04L 12/26* | (2006.01) |
| *H04L 12/40* | (2006.01) |
| *H04L 29/08* | (2006.01) |

(52) U.S. Cl.
CPC ...... *H04L 63/1416* (2013.01); *H04L 43/0876* (2013.01); *H04L 12/40* (2013.01); *H04L 67/12* (2013.01); *H04L 2012/40215* (2013.01); *H04L 2012/40273* (2013.01)

(58) Field of Classification Search
USPC ..................................... 726/23, 25
See application file for complete search history.

(56) References Cited

U.S. PATENT DOCUMENTS

| | | | | |
|---|---|---|---|---|
| 8,364,960 B2* | 1/2013 | Baroffio | ................. | G06F 21/44 713/168 |
| 2004/0203844 A1* | 10/2004 | Rajkotia | ............... | H04W 64/00 455/456.1 |
| 2005/0011367 A1 | 1/2005 | Crow | | |
| 2008/0016333 A1* | 1/2008 | Cao | ....................... | H04L 9/3226 713/155 |
| 2008/0263632 A1* | 10/2008 | Keon | ................... | H04L 12/2854 726/3 |
| 2009/0311992 A1* | 12/2009 | Jagetiya | .............. | H04M 1/7243 455/412.1 |
| 2010/0226248 A1* | 9/2010 | Grilli | .................... | H04L 47/743 370/230 |

(Continued)

*Primary Examiner* — Jude Jean Gilles
(74) *Attorney, Agent, or Firm* — Norton Rose Fulbright US LLP; Gerard Messina

(57) ABSTRACT

An apparatus and a method for calibrating a system for recognizing attempts to penetrate into a computer network, in particular of a motor vehicle, at least one parameter being estimated on the basis of a data set, the data set encompassing values that characterize a detected occurrence of messages in the computer network; a distribution function being determined on the basis of the at least one parameter; an inverse of the distribution function being determined; and at least one limit for the values being calibrated, on the basis of the inverse, in a rule for rule-based recognition of attempts to penetrate into the computer network.

20 Claims, 3 Drawing Sheets

(56) References Cited

U.S. PATENT DOCUMENTS

| | | | |
|---|---|---|---|
| 2010/0271002 A1* | 10/2010 | Wakimoto | G01R 31/34 |
| | | | 324/76.21 |
| 2014/0321305 A1* | 10/2014 | Lee | H04W 74/04 |
| | | | 370/252 |
| 2015/0092768 A1* | 4/2015 | Ng | H04J 11/0069 |
| | | | 370/350 |
| 2016/0180220 A1* | 6/2016 | Boettcher | G05B 19/042 |
| | | | 700/276 |
| 2016/0188876 A1 | 6/2016 | Harris et al. | |
| 2016/0313023 A1* | 10/2016 | Przybylski | F24F 11/30 |
| 2016/0377650 A1* | 12/2016 | Anderson | G01P 21/00 |
| | | | 702/104 |
| 2017/0003150 A1* | 1/2017 | Noboa | F25B 13/00 |
| 2017/0276571 A1* | 9/2017 | Vitullo | G06Q 10/06 |
| 2018/0278641 A1 | 9/2018 | Neil et al. | |
| 2019/0238253 A1* | 8/2019 | Froc | G02B 6/12033 |

* cited by examiner

| Timestamp | ID | DLC | Byte0 | Byte1 | Byte2 | Byte3 | Byte4 | Byte5 | Byte6 | Byte7 |
|---|---|---|---|---|---|---|---|---|---|---|
| 0.0001 | B | 8 | AF | 00 | 2D | 13 | F1 | 2C | AA | 00 |
| 0.0003 | A | 8 | BB | 2B | 26 | C1 | 00 | 10 | 00 | 00 |
| 0.0004 | C | 8 | FA | 54 | BA | 11 | 14 | AF | BB | CC |
| 0.0006 | A | 8 | BB | 2B | 26 | C2 | 00 | 10 | 00 | 00 |
| 0.0007 | B | 8 | AF | 02 | 2D | 13 | F1 | 2C | AA | 00 |
| 0.0008 | A | 8 | BB | 2B | 26 | C3 | 00 | 10 | 00 | 00 |
| 0.0011 | A | 8 | BB | 2B | 26 | C4 | 00 | 10 | 00 | 00 |
| 0.0012 | C | 8 | FA | 54 | BA | 11 | 14 | AF | BB | CC |
| 0.0013 | B | 8 | AF | 03 | 2D | 13 | F1 | 2C | AA | 00 |
| 0.0015 | A | 8 | BB | 2B | 26 | C5 | 00 | 00 | 00 | 00 |
| ... | | | | | | | | | | |

METHOD AND APPARATUS FOR CALIBRATING A SYSTEM FOR RECOGNIZING ATTEMPTS TO PENETRATE A COMPUTER NETWORK

RELATED APPLICATION INFORMATION

The present application claims priority to and the benefit of German patent application no. 10 2018 206 737.6, which was filed in Germany on May 2, 2018, the disclosure of which is incorporated herein by reference.

FIELD OF THE INVENTION

The present invention relates to a method and an apparatus for calibrating a system for recognizing attempts to penetrate into a computer network, in particular of a motor vehicle.

BACKGROUND INFORMATION

Attempts to penetrate into computer networks are recognized, for example, in a rule-based manner by the fact that monitoring occurs, by way of rules, as to whether a cycle time of actually occurring cyclic messages lies within a predefined range for deterministic transmission of those messages in the computer network.

The rules are determined statically by defining limits of the predefined range. If values of the cycle time lie outside the limits, a penetration attempt is recognized.

It is therefore desirable to determine the limits in such a way that no "false positive" (FP) reports occur, and so that "false negative" (FN) reports are avoided.

SUMMARY OF THE INVENTION

This is achieved by way of the method and apparatus as described herein.

The method for calibrating a system for recognizing attempts to penetrate into a computer network, in particular of a motor vehicle, provides that: at least one parameter is estimated on the basis of a data set, the data set encompassing values that characterize a detected occurrence of messages in the computer network; a distribution function is determined for the values on the basis of at least one parameter; an inverse of the distribution function is determined; and at least one limit for the values is calibrated, on the basis of the inverse, in a rule for rule-based recognition of attempts to penetrate into the computer network. This method is applicable to rules in which ranges are determined as limits. The limits are determined in a data-based manner. Any asymmetries in the data are thereby also taken into account in the limits. With significantly narrower ranges, the number of "false negative" reports is thereby reduced. Only a small number of test runs are required for calibration. Calibration is carried out automatically on the basis thereof.

A probability may be predefined, and the at least one limit is determined on the basis of a functional value of the inverse in the context of a function argument that is determined on the basis of the probability. A fixed probability, for example 90%, is used in order to calibrate the sensitivity of the recognition.

An extreme value may be predefined, and the at least one limit is determined on the basis of a function value of the inverse in the context of a function argument that is determined on the basis of the probability. This method has the advantage that it does not itself produce any "false positive" reports on a training data set.

A lower limit for values may be determined, the lower limit characterizing values below which a penetration attempt is recognized. An excessively large number of cyclic repetitions of detected messages is thus recognizable, for example, as a penetration attempt.

A minimum of the values may be determined, and the lower limit is determined on the basis of a functional value of the inverse at the minimum.

An upper limit for values may be determined, the upper limit characterizing values above which a penetration attempt is recognized. An excessively small number of cyclic repetitions of detected messages is thus recognizable, for example, as a penetration attempt.

A maximum of the values may be determined, and the upper limit is determined on the basis of a functional value of the inverse at the maximum.

The values may characterize: a time difference between the occurrence of messages detected in the computer network; an average time difference between the occurrence of messages detected in the computer network; a rate of change in the occurrence of messages detected in the computer network; an average rate of change in the occurrence of messages detected in the computer network; or a correlation coefficient for the occurrence of messages detected in the computer network. These values can be extracted particularly effectively from measurements in the computer network.

The values may be determined from a measurement of messages detected in the computer network.

The apparatus for calibrating a system for recognizing attempts to penetrate into a computer network, in particular of a motor vehicle, encompasses a processor and at least one data memory which are embodied: to estimate at least one parameter on the basis of a data set, the data set encompassing values that characterize a detected occurrence of messages in the computer network; to determine a distribution function for the values on the basis of the at least one parameter; to determine an inverse of the distribution function; and to calibrate, on the basis of the inverse, at least one limit for the values in a rule for rule-based recognition of attempts to penetrate into the computer network.

Further advantageous embodiments are evident from the description that follows and from the drawings.

BRIEF DESCRIPTION OF THE DRAWINGS

FIG. 2 schematically depicts an extraction of data.

DETAILED DESCRIPTION

Figure 1:
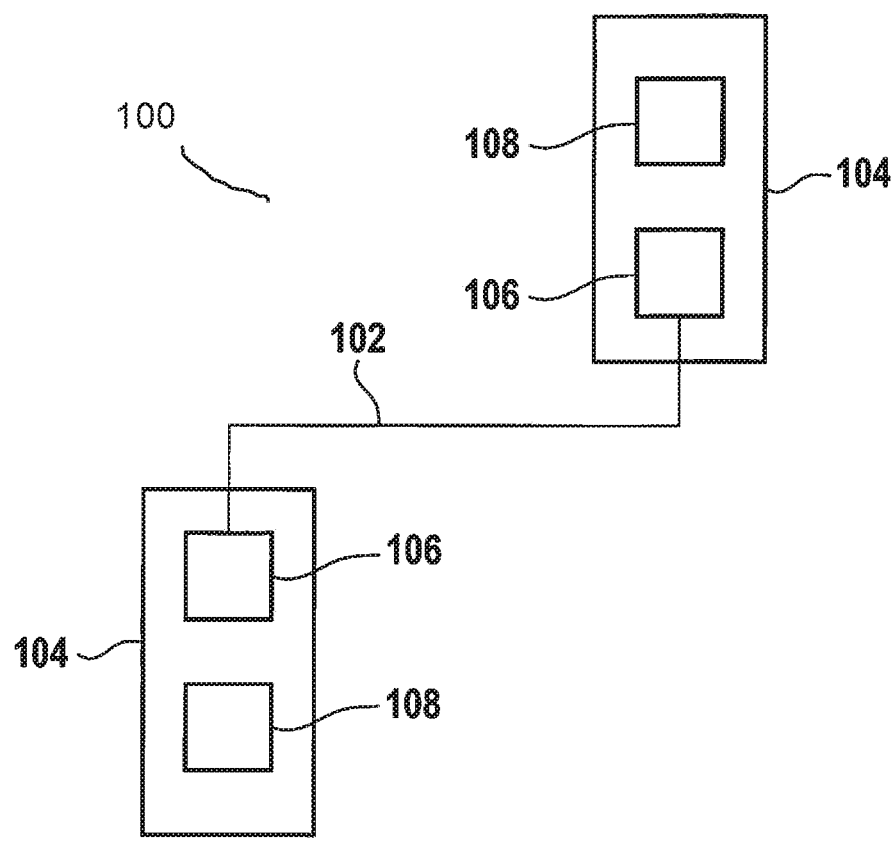
FIG. 1 schematically depicts parts of a computer network.

FIG. 1 schematically shows parts of a computer network 100.

In the example, computer network 100 encompasses a bus 102, in particular a controller area network bus, that interconnects devices 104 in particular of a motor vehicle.

In the example, devices 104 encompass a respective processor 106 and a respective data memory 108. It is assumed that a calibration of devices 104 for use in a system for recognizing attempts to penetrate into computer network 100 has taken place.

Processor 106 and data memory 108 are embodied to carry out the method described below.

The method is described for the example of a cyclic message transfer on the controller area network. In the example, an occurrence of messages having the same CAN ID is detected. In the example, in the normal state messages having that CAN ID are intended to be transmitted with a specific cycle time $\mu_s$.

In the example, measurements (called "CAN traces") are detected on the bus, and from them, time stamps of messages having that CAN ID can be extracted. In the example, cycle times $\mu$ in particular between directly successive messages having that CAN ID are determined from the time stamps as parameters for estimation. Values x that characterize a detected occurrence of messages in the computer network are determined on the basis of the actually occurring cycle times $\mu$. The result is to generate a data set X that contains the values x.

In the example, a penetration attempt is recognized when one or more of the cycle times $\mu$ lies outside a range $[a^\sim, b^\sim]$ of permitted cycle times.

The underlying principle is a statistical method that is based on the Fisher-Tippett-Gnedenko theorem and the generalized extreme value distribution. Assume a data set X as described above. On the assumption that a series $\{X_i\}^n_{i=1}$ of independent and identically distributed random variables can be approximated as a result of any permutation of that data set X, an extreme value distribution of an nth-order statistic converges to a distribution function $G_i(z)$ if n converges to $\infty$. The data set X and the series $\{X_i\}^n_{i=1}$ have an equivalent meaning for the description that follows. The distribution function $G_i(z)$ depends on the following parameters:

(i) an expected value $\mu_i$ of the nth-order statistic;
(ii) a standard deviation $\sigma_i$ of the nth-order statistic;
(iii) a shape parameter $\Gamma_i$ of the nth-order statistic.

The parameters $\mu_i$, $\sigma_i$, and $\Gamma_i$ can be estimated with the aid of the series $\{X_i\}^n_{i=1}$. This is accomplished, for example, using a maximum likelihood estimator, a generalized maximum likelihood estimator, a Bayes estimator, an L-moments estimator, or another suitable estimator. Since typically no analytical solution exists for these methods, the parameters are approximated numerically, selecting for the purpose e.g. a block maximum approach, a threshold excess approach, or another suitable estimator.

The estimators for the parameters $\mu_i$, $\sigma_i$, and $\Gamma_i$ are sufficiently described in the literature.

The extreme value distribution of the nth-order statistic converges toward a distribution $G_1(z)$ when i goes to $\infty$. The distribution $G_1(z)$ is a distribution that depends on the parameters $\mu_1$, $\sigma_1$, and $\Gamma_1$. The parameters $\mu_1$, $\sigma_1$, and $\Gamma_1$ can be estimated with the aid of the series $\{X_i\}^n_{i=1}$. The extreme value distribution of the zero-order statistic converges to a distribution $G_0(z)$ when i goes to $\infty$. The distribution $G_0(z)$ is a distribution that depends on the parameters $\mu_0$, $\sigma_0$, and $\Gamma_0$. The parameters $\mu_0$, $\sigma_0$, and $\Gamma_0$ can be estimated with the aid of the series $\{X_i\}^n_{i=1}$.

Once estimated values for the parameters $\mu_i$, $\sigma_i$, and $\Gamma_i$ are determined, the distribution function $G_i(z)$, $i \in \{0,1\}$ is obtained as follows:

(i) Weibull distributed when $\Gamma_i < 0$ and therefore:

$G_i(z) = \exp((-y)^\alpha)$ when $y < 0$ $G_i(z) = 0$ when $y \geq 0$ where $\alpha = -(1/\Gamma_i)$ $y = -(1 + -\Gamma_i(z - \mu_i)/\sigma_i)$ (ii) Fréchet distributed when $\Gamma_i > 0$ and therefore:

$G_i(z) = \exp)(-y^\alpha)$ when $y > 0$ $G_i(z) = 0$ when $y \leq 0$ where $\alpha = 1/\Gamma_i$ $y = 1 + \Gamma_i(z - \mu_i)/\sigma_i$ (iii) Gumbel distributed when $\Gamma_i = 0$ and therefore:

$G_i(z) = \exp(-\exp(-(z - \mu_i)/\sigma_i))$.

The distribution functions $G_i(z)$ can be inverted, and the inverse is referred to as $G_i^{-1}(z)$, such that $G_i^{-1}(G_i(z)) = z$.

The distribution functions $G_i(z)$ are utilized in order to calibrate limits, i.e. in the specific example to find permissible limits $a^\sim$, $b^\sim$ for the cycle times $\mu$.

A variety of methods can be used for this:

(i) A fixed probability p (e.g. 0.9) can be used in order to estimate a range $[a^\sim, b^\sim]$:

$[a^\sim, b^\sim] = [G_0^{-1}(1-p), G_1^{-1}(p)]$.

Note that the closer the probability p is to a value of 1, the greater the certainty that the limits will not be breached later during utilization.

(ii) Extreme values of the series $\{X_i\}^n_{i=1}$ can be determined. In the example, a minimum m and a maximum M of the series $\{X_i\}^n_{i=1}$ are calculated as $\{X_i\}^n_{i=1}$. The probabilities $[p_0, p_1] = [G_0(m), G_1(M)]$ are then calculated.

A small value for p (e.g. 0.1) is added to the probabilities $[p_0, p_1]$. The range is thus estimated as $[a^\sim, b^\sim] = [G_0^{-1}((\max((p_0 - p), 0)), G_1^{-1}(\min((p + p_1), 1))]$.

This method has the advantage that a "false positive" report cannot exist on the training data set of the series $\{X_i\}^n_{i=1}$. "False positive" refers here to values $X_i$ of the series $\{X_i\}^n_{i=1}$ which do not lie within $[a^\sim, b^\sim]$.

Alternatively, p can also be selected differently and separately for $p_0$ and $p_1$.

The limits $[a^\sim, b^\sim]$ thereby ascertained are used, in the example, to create rules for the cycle time $\mu$ of the messages under consideration having the same CAN ID.

The method described can always be utilized upon configuration as soon as minimum, maximum, or minimum and maximum limits for a rule are required. In addition to the cycle times $\mu$ this can also encompass, for example, value ranges of specific signals, rates of change, correlation coefficients, or respective average-value considerations.

An exemplifying depiction of an extraction of a series $\{X_i\}^n_{i=1}$ is reproduced in FIG. 2. The messages having the same CAN ID, namely A, are considered in terms of their cycle time $\mu$, and a data set X=0.0003, 0.0002, 0.0003, 0.0004, . . . is extracted.

A method for calibrating a system for recognizing attempts to penetrate into a computer network, in particular of a motor vehicle, will be described with reference to FIG. 3.

Figure 3:
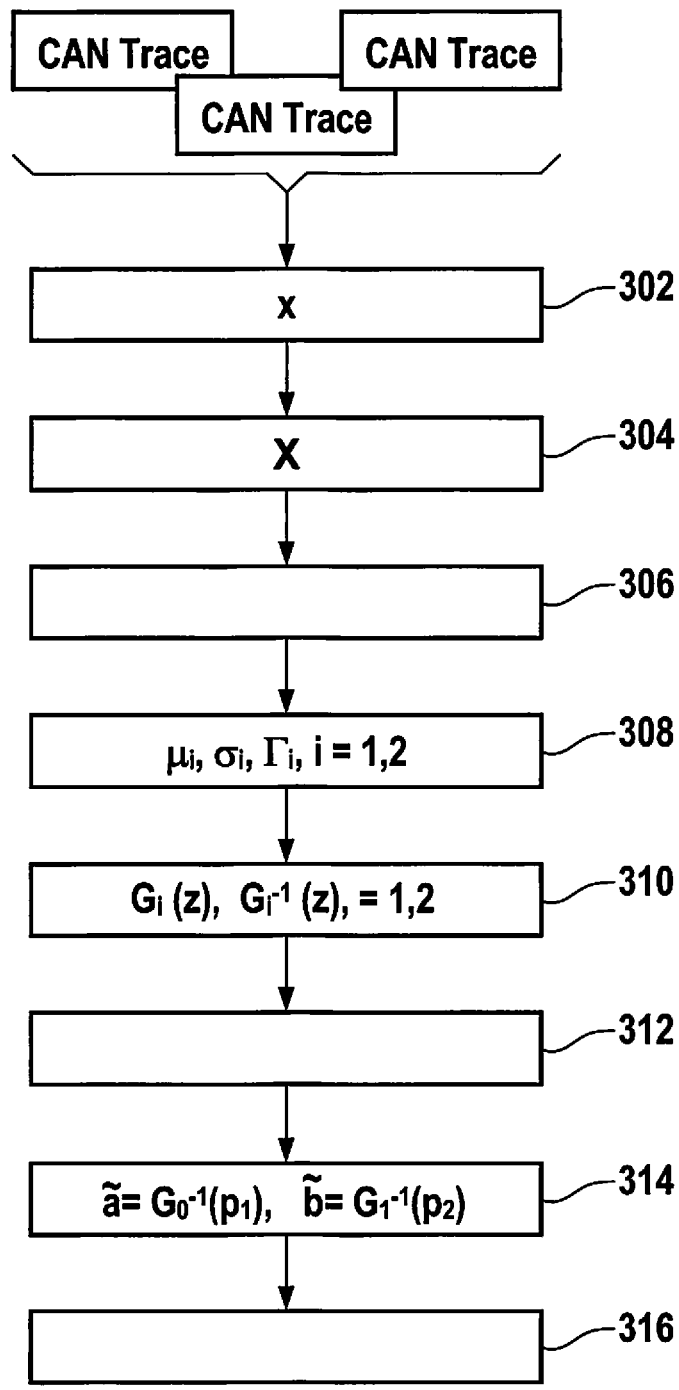
FIG. 3 schematically shows steps in a method.

The assumption underlying the method is that measurements (in the example, CAN measurements that are labeled "CAN trace" in FIG. 3) of messages detected in the computer network are available.

In a step 302, values x that characterize a detected occurrence of messages in the computer network are determined from one or several measurements.

In step 304, a data set X encompassing the values x is determined.

In an optional step 306, the data set X is pre-processed. For example, the data set X is mixed.

In a step 308, parameters where $\mu_i$, $\sigma_i$, $\Gamma_i$, where $i \in \{0, 1\}$, are estimated on the basis of data set X. The procedure is to use estimators for the parameters $\mu_i$, $\sigma_i$, and $\Gamma_i$ as described above.

In a step 310, a distribution function $G_i(z)$ is determined on the basis of the parameters $\mu_i$, $\sigma_i$, $\Gamma_i$, where $i \in \{0, 1\}$. In step 310, an inverse $G_i^{-1}(z)$ of the distribution function $G_i(z)$, where $i \in \{0, 1\}$, is determined. One of the methods described above is used for this.

In a step 312, the probabilities $[p_0, p_1]$ are determined. The methods described above are used for this.

Instead or additionally, the probability p can be predefined as described above. If the probability p is predefined, the lower limit a~ is determined on the basis of a function value of the inverse $G_0^{-1}(1-p)$ in the context of a function argument that is determined on the basis of the probability p. Alternatively or additionally, an upper limit b~ can be determined on the basis of a function value of the inverse $G_1^{-1}(1-p)$ in the context of a function argument that is determined on the basis of the probability p.

It is also possible to predefine one extreme value, and to determine one of the limits on the basis of a function value of the inverse in the context of a function argument that is determined on the basis of the probability p and the extreme value.

A minimum m of the values x can be determined. In this case the lower limit a~, for example, is determined on the basis of a function value of the inverse $G_0(m)$ at the minimum m. Alternatively or additionally, a maximum M of the values x can be determined. In this case the upper limit b~ can be determined on the basis of a function value of the inverse $G_1(M)$ at the maximum M.

In particular, the probabilities $[p_0, p_1] = [G_0(m), G_1(M)]$ can be determined.

In a step 314, at least one limit a~, b~ is determined on the basis of the inverse $G_i^{-1}(z)$, where $i \in \{0, 1\}$, and the probabilities $[p_0, p_1]$ and/or the probability p are determined. One of the methods described above is used for this.

In a step 316, the at least one limit a~, b~ for the values x is converted into a rule for rule-based recognition of penetration attempts.

The method then ends.

A lower limit a~ for values x is determined, for example, characterizing values x below which a penetration attempt is recognized.

An upper limit b~ for values x is determined, for example, characterizing values x above which a penetration attempt is recognized.

In the example, the values x characterize a time difference between the occurrence of messages detected in the computer network. It is also possible to use values that characterize: an average time difference between the occurrence of messages detected in the computer network; a rate of change in the occurrence of messages detected in the computer network; an average rate of change in the occurrence of messages detected in the computer network; or a correlation coefficient for the occurrence of messages detected in the computer network.

What is claimed is:

1. A method for calibrating a system for recognizing attempts to penetrate into a computer network, the method comprising:
    estimating at least one parameter based on a data set, the data set encompassing values that characterize a detected occurrence of messages in the computer network;
    determining a distribution function based on the at least one parameter;
    determining an inverse function of the distribution function; and
    calibrating at least one limit for the values, based on the inverse function, in a rule for rule-based recognition of attempts to penetrate into the computer network.

2. The method of claim 1, wherein a probability is predefined, and the at least one limit is determined based on a functional value of the inverse function in the context of a function argument that is determined based on the probability.

3. The method of claim 2, wherein an extreme value is predefined, and the at least one limit is determined based on the function value of the inverse function in the context of a function argument that is determined based on the probability.

4. The method of claim 1, wherein a lower limit for the values is determined, and wherein the lower limit characterizes values below which a penetration attempt is recognized.

5. The method of claim 4, wherein a minimum of the values is determined, and the lower limit is determined based on a functional value of the inverse function at the minimum.

6. The method of claim 1, wherein an upper limit for the values is determined, and wherein the upper limit characterizes values above which a penetration attempt is recognized.

7. The method of claim 6, wherein a maximum of the values is determined, and the upper limit is determined based on a functional value of the inverse function at the maximum.

8. The method of claim 1, wherein the values characterize one of: a time difference between the occurrence of messages detected in the computer network; an average time difference between the occurrence of messages detected in the computer network; a rate of change in the occurrence of messages detected in the computer network; an average rate of change in the occurrence of messages detected in the computer network; or a correlation coefficient for the occurrence of messages detected in the computer network.

9. The method of claim 1, wherein the values are determined from a measurement of messages detected in the computer network.

10. The method of claim 1, wherein the computer network is for a motor vehicle.

11. An apparatus for calibrating a system for recognizing attempts to penetrate into a computer network, comprising:
    a processor and at least one data memory, which are configured to perform the following:
    estimating at least one parameter based on a data set, the data set encompassing values that characterize a detected occurrence of messages in the computer network;

determining a distribution function for the values based on the at least one parameter;

determining an inverse function of the distribution function; and calibrating, based on the inverse function, at least one limit for the values in a rule for rule-based recognition of attempts to penetrate into the computer network.

12. The apparatus of claim 11, wherein the computer network is for a motor vehicle.

13. The method as recited in claim 1, further comprising:

recognizing an attempt to penetrate into the computer network using the rule with the calibrated at least one limit for the values.

14. The method as recited in claim 1, wherein, before the estimating step, the dataset is formed based on timestamps of the messages.

15. The method as recited in claim 14, wherein the dataset is formed using cycle times determined based on the timestamps of the messages.

16. The method as recited in claim 15, wherein the computer network is a Controller Area Network (CAN), and wherein the messages are messages having the same CAN ID.

17. The apparatus as recited in claim 11, wherein the processor and the at least one data memory are further configure to perform:

recognizing an attempt to penetrate into the computer network using the rule with the calibrated at least one limit for the values.

18. The apparatus as recited in claim 11, wherein, before the estimating, the dataset is formed based on timestamps of the messages.

19. The apparatus as recited in claim 18, wherein the dataset is formed using cycle times determined based on the timestamps of the messages.

20. The apparatus as recited in claim 19, wherein the computer network is a Controller Area Network (CAN), and wherein the messages are messages having the same CAN ID.

* * * * *